ic Office 3,025,302
Patented Mar. 13, 1962

3,025,302
N-[PHENYL(4-PYRIDYL)METHYL] AMIDES
AND PROCESS
Calvin Lovell, Morton Grove, and Kurt J. Rorig, Glenview, Ill., assignors to G. D. Searle & Co., Chicago, Ill., a corporation of Delaware
No Drawing. Filed Apr. 15, 1959, Ser. No. 806,427
11 Claims. (Cl. 260—295)

The invention relates to N-[phenyl(4-pyridyl)-methyl]-amides and a process for their manufacture. More particularly, this invention relates to compounds of the formula

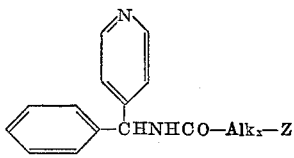

wherein Alk represents an alkylene or alkenylene radical, Z represents an alkyl or optionally alkoxylated phenyl radical, and $x$ represents 0 or the positive integer 1.

Among the alkylene and alkenylene radicals represented by Alk in the foregoing formula, especially lower alkylene and alkenylene groupings are preferred, for example, methylene, ethylene, vinylene, trimethylene, propylene, propenylene, tetramethylene, etc. The alkyl radicals represented by Z in the formula also are desirably of lower order, which is to say methyl, ethyl, propyl, isopropyl, butyl, isobutyl, sec-butyl, tert-butyl, pentyl, isopentyl, tert-pentyl, neopentyl, hexyl, isohexyl, heptyl, octyl, and like $C_nH_{2n+1}$ groupings wherein $n$ is a positive integer amounting to less than 9. When Z represents a carbocyclic grouping, on the other hand, said grouping is, as set forth above, either a phenyl radical or a phenyl radical substituted by at least 1 and as many as several alkoxy radicals—optimally, alkoxy radicals of the formula, —O-lower alkyl.

It will be recognized that when $x$ in the foregoing formula is 0, the Alk term drops out, and the compounds contemplated can be depicted

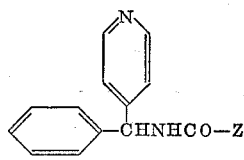

Z being defined as before.

Equivalent to the basic amides of this invention for the purposes described are non-toxic acid addition and quaternary ammonium salts thereof, the compositions of which are comprehended by

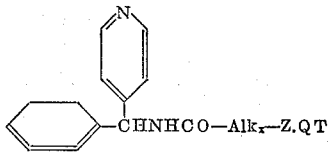

wherein Alk, Z, and X have the meanings assigned above; Q is selected from among hydrogen and lower alkyl, hydroxy(lower alkyl), and lower alkenyl radicals, as also such aralkyl radicals as benzyl, phenethyl, and naphthylmethyl; and T is 1 equivalent of an anion—for example, chloride, bromide, iodide, nitrate, phosphate, sulfate, sulfamate, methyl sulfate, ethyl sulfate, benzenesulfonate, toluenesulfonate, acetate, lactate, succinate, malate, maleate, tartrate, citrate, gluconate, ascorbate, benzoate, cinnamate, or the like—which, in combination with the cationic portion of a salt aforesaid, is neither pharmacologically nor otherwise undesirable in pharmaceutical dosage.

The compounds herein disclosed are useful because of their valuable pharmacological properties. Thus, for example, the subject products selectively depress the central nervous system and, accordingly, are characterized by highly desirable tranquilizing and barbiturate-potentiating activity.

The compounds to which this invention relates are preparable by a variety of methods, but a preferred procedure comprises heating 4-(α-aminobenzyl)pyridine with an appropriate acid chloride Z—Alk$_x$COCl (Z, Alk, and $x$ being defined as before) in an inert solvent such as acetone, butanone, chloroform, benzene, xylene, or the like, an acid acceptor such as pyridine or triethylamine being present if desired. The starting amine is obtained by interaction of 4-benzoylpyridine, formic acid, and ammonia in aqueous medium at temperatures ranging from 10 to 165°, followed by hydrolysis with boiling hydrochloric acid.

Conversion of the basic amides of this invention to corresponding acid addition salts is accomplished by simple admixture with 1 equivalent of any of various inorganic or strong organic acids, the anionic portion of which conforms to T as hereinabove defined.

The quaternary ammonium compounds comprehended by this invention are those derived by contacting a claimed base with an organic ester of the formula

Q—T

Q and T being limited by the meanings hereinbefore assigned, and it being additionally provided that Q is not hydrogen. Quaternization takes place in the temperature range between 45 and 100° using an inert solvent such as chloroform, acetone, butanone, methanol, butanol, or the like as reaction medium. Quaternization is ordinarily completed in from 1 to 48 hours and is generally carried out in a closed system if a lower alkyl halide—such as methyl chloride—is one of the reagents. Using methyl bromide, the manufacture of quaternary salts may be smoothly effected in butanone solution at 70°, the reaction time being approximately 1 hour.

The following examples described in detail certain of the compounds illustrative of the present invention and methods which have been devised for their manufacture. However, the invention is not to be construed as limited thereby, either in spirit or in scope, since it will be apparent to those skilled in the art of organic synthesis that many modifications, both of materials and of methods, may be practiced without departing from the purpose and intent of this disclosure. In the examples hereinafter detailed, temperatures are given in degrees centigrade, pressures in millimeters of mercury, and relative amounts of materials in parts by weight, except as otherwise noted.

*Example 1*

A. *4-(α-aminobenzyl)pyridine.*—To a solution of 143 parts of concentrated ammonium hydroxide in 150 parts of 90% formic acid at 10° is added, with agitation, approximately 92 parts of 4-benzoylpyridine. The resultant mixture is distilled to an internal temperature of 163°, following which it is maintained in the range 163–175° under reflux for 20 hours, agitation being continued the while. The mixture is then cooled to room temperature, diluted with 360 parts of concentrated hydrochloric acid, and finally heated at the boiling point under reflux for 7½ hours. Solution occurs in process. The solution is poured into a mixture of ice and water; and an excess of caustic is then added. The resultant mixture is extracted with ether, and the ether extract, in turn, is extracted with 5% hydrochloric acid. From the acid extract, on introduction of an excess of caustic, is precipitated 4-(α-aminobenzyl)pyridine, which, extracted with ether, dried over anhydrous sodium sulfate, stripped of solvent by evaporation, and distilled, boils at 143–147° under 0.1 mm. pressure. The product has the formula

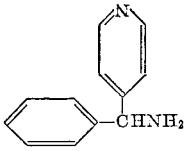

Upon acidification of an anhydrous ethanol solution of 4-(α-aminobenzyl)pyridine with hydrogen chloride dissolved in 2-propanol, 4-(α-aminobenzyl)pyridine dihydrochloride is precipitated. The salt melts at 234–236° with vigorous decomposition.

B. *N-[phenyl(4-pyridyl)methyl]acetamide.*—To a solution of approximately 28 parts of 4-(α-aminobenzyl)-pyridine in 160 parts of butanone at the boiling point under reflux is added, cautiously with agitation, a solution of approximately 13 parts of acetyl chloride in 80 parts of butanone. Agitation at the boiling point under reflux is maintained overnight, whereupon the precipitate formed in process is filtered off and taken up in water. From the aqueous extract, on alkalization, N-[phenyl(4-pyridyl)methyl]acetamide precipitates. The product is extracted into ether; and the ether extract is, successively, dried over anhydrous potassium carbonate, treated with decolorizing charcoal, concentrated to incipient crystallization, and chilled. The purified N-[phenyl(4-pyridyl)methyl]acetamide thrown down is recovered by filtration. It melts at 132–134° and has the formula

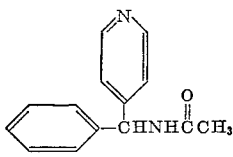

*Example 2*

*N-[phenyl(4-pyridyl)methyl]caprylamide.*—To a solution of approximately 28 parts of 4-(α-aminobenzyl)-pyridine in 175 parts of butanone at the boiling point under reflux is added, cautiously with agitation, a solution of approximately 29 parts of capryloyl chloride in 80 parts of butanone. Agitation at the boiling point under reflux is maintained overnight, whereupon the solvent is removed by vacuum distillation, and the residue is extracted with water. The aqueous extract is made alkaline with caustic, and the resultant mixture is extracted with ether. The ether extract is, successively, dried over anhydrous potassium carbonate, treated with decolorizing charcoal, and stripped of solvent by evaporation. The residue, crystallized from a mixture of ethyl acetate and hexane, affords the desired N-[phenyl(4-pyridyl)methyl]caprylamide, melting at 82–84°. The product has the formula

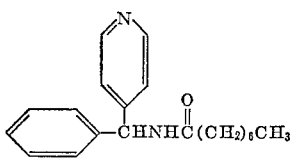

Upon acidification of an anhydrous ethanol solution of the foregoing basic amide with hydrogen chloride dissolved in 2-propanol, N-[phenyl(4-pyridyl)methyl]-caprylamide hydrochloride is precipitated. The salt is isolated by filtration.

*Example 3*

*N-[phenyl(4-pyridyl)methyl]benzamide.*—To a solution of approximately 28 parts of 4-(α-aminobenzyl)-pyridine in approximately 175 parts of butanone at the boiling point under reflux is added, cautiously with agitation, a solution of approximately 25 parts of benzoyl chloride in 90 parts of butanone. Agitation at the boiling point under reflux is maintained overnight, whereupon the solvent is removed by vacuum distillation. The residue is thoroughly mixed with an excess of aqueous caustic, and the mixture thus obtained is extracted with chloroform. The chloroform extract is dried over anhydrous sodium sulfate and anhydrous potassium carbonate in the presence of decolorizing charcoal, then filtered, and finally stripped of solvent by distillation. The residue, crystallized from benzene, affords the desired N-[phenyl(4-pyridyl)methyl]benzamide, melting at 171–173°. The product has the formula

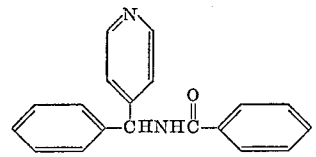

*Example 4*

*3,4,5 - trimethoxy - N - [phenyl(4 - pyridyl)methyl]-benzamide.*—To a solution of 23 parts of 3,4,5-trimethoxybenzoyl chloride in 120 parts of butanone is added, with agitation, approximately 9 parts of 4(α-aminobenzyl)-pyridine in 80 parts of butanone. The resulting mixture is heated at the boiling point under reflux, whereupon 5 parts of triethylamine is introduced, and the mixture is then maintained at the boiling point for 6 hours, agitation being continued the while. Following the heating period, butanone is removed by vacuum distillation, and the residue is thoroughly extracted with water. The aqueous extract is filtered; and the filtrate is made alkaline with caustic, causing precipitation of 3,4,5,-trimethoxy-N-[phenyl(4-pyridyl)methyl]benzamide. The product is isolated by filtration and further purified by recrystallization from benzene. It melts at 184–187° and has the formula

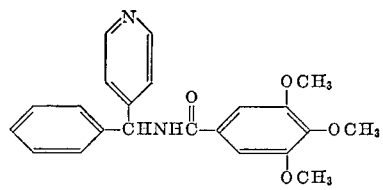

*Example 5*

*N - [phenyl(4 - pyridyl)methyl] - 3,4,5 - triethoxybenzamide.*—To a solution of approximately 27 parts of 3,4,5-triethoxybenzoyl chloride in 80 parts of butanone is added, with agitation, approximately 18 parts of 4-(α-aminobenzyl)pyridine dissolved in 80 parts of butanone. A precipitate forms. The resulting mixture is heated at the boiling point under reflux with agitation overnight, then cooled to room temperature and filtered. The filtrate is stripped of solvent by vacuum distillation, and the residue is extracted with ether in the presence of excess aqueous alkali. The ether extract, in turn, is extracted with 5% hydrochloric acid. Upon alkalization of the acid extract, the desired N-[phenyl(4-pyridyl)methyl]-3,4,5,-triethoxybenzamide precipitates. Recrystallized from 2-propanol, it melts at 195–197°. The product has the formula

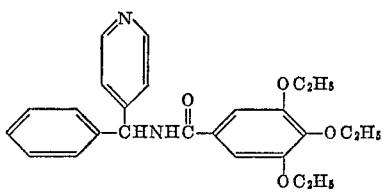

Example 6

α - (p - Methoxyphenyl) - N - [phenyl(4 - pyridyl) methyl ] - acetamide.—Using the technique of Example 3, approximately 18 parts of 4-(α-aminobenzyl)pyridine and 22 parts of p-methoxyphenylacetyl chloride are reacted together in the presence of 160 parts of butanone to give α - (p - methoxyphenyl) - N - [phenyl(4-pyridyl) methyl]acetamide. The product melts at 164–167° and has the formula

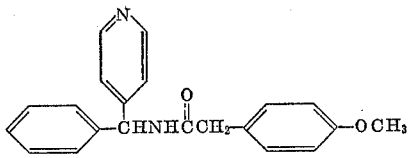

Example 7

α - (3,4 - dimethoxyphenyl) - N - [phenyl(4 - pyridyl)-methyl]acetamide.—To a solution of approximately 18 parts of 4-(α-aminobenzyl)pyridine in 160 parts of butanone at the boiling point under reflux is added approximately 20 parts of 3,4-dimethoxyphenylacetyl chloride. Agitation at the boiling point under reflux is maintained overnight, whereupon the solvent is removed by vacuum distillation. The residue is thoroughly mixed with an excess of aqueous caustic, and the mixture thus obtained is extracted with chloroform. The chloroform extract is stripped of solvent by distillation, and the residue is taken up in benzene. The benzene extract is extracted with 5% hydrochloric acid, and the acid extract is made alkaline with caustic. The resulting mixture is extracted with benzene. Upon evaporation of benzene to incipient precipitation, followed by refrigeration, α-(3,4-dimethoxyphenyl)-N-[phenyl(4 - pyridyl)methyl]acetamide crystallizes. The product melts at 137–140° and has the formula

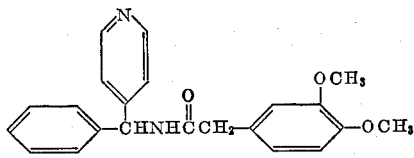

Example 8

α - (3,4,5 - trimethoxyphenyl) - N - [phenyl(4 - pyridyl)-methyl]acetamide.—A mixture of 30 parts of 3,4,5-trimethoxyphenylacetic acid, 80 parts of thionyl chloride, 300 parts of chloroform, and 1 part of pyridine is heated at the boiling point under reflux for 2 hours. Solvent is then removed by vacuum distillation, and approximately 80 parts of benzene is distilled from the residue to insure complete elimination of excess thionyl chloride. The material thus obtained is 3,4,5-trimethoxyphenylacetyl chloride. To a solution thereof in 120 parts of butanone at the boiling point under reflux is added, cautiously with agitation, approximately 15 parts of 4-(α-aminobenzyl)-pyridine in 160 parts of butanone. Agitation under reflux is maintained overnight, whereupon the solvent is removed by vacuum distillation. The residue is thoroughly mixed with an excess of aqueous caustic, and the mixture thus obtained is extracted with chloroform. The chloroform extract is dried over anhydrous sodium sulfate in the presence of decolorizing charcoal, then filtered, and finally stripped of solvent by distillation. The residue, crystallized from benzene, affords the desired α - (3,4,5 - trimethoxyphenyl) - N - [phenyl(4-pyridyl)methyl]acetamide, melting at 158–161°. The product has the formula

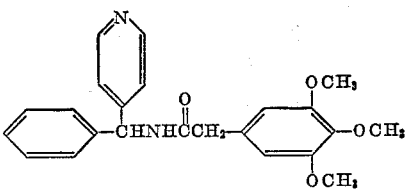

Example 9

α-(m-Ethoxybenzyl) - N - [phenyl(4-pyridyl)methyl]-acetamide.—Using the procedure applied by Johnson and Shelberg, J. Amer. Chem. Soc., 67, 1853 (1945), to m-methoxycinnamic acid, 360 parts of m-ethoxycinnamic acid dissolved in 2000 parts of glacial acetic acid is hydrogenated over 1 part of Adams catalyst to give 3-(m-ethoxyphenyl)propionic acid. Approximately 30 parts of this acid is converted to the corresponding acid chloride with 37 parts of phosphorus pentachloride in the manner described for the methoxy analog by Johnson and Shelberg, loc. cit. Proceeding then as detailed in Example 3 hereinbefore, approximately 33 parts of 3-(m-ethoxyphenyl)propionyl chloride and 28 parts of 4-(α-aminobenzyl)pyridine in 400 parts of butanone is reacted together to give α-(m-ethoxybenzyl)-N-[phenyl-(4-pyridyl)methyl]acetamide. The product has the formula

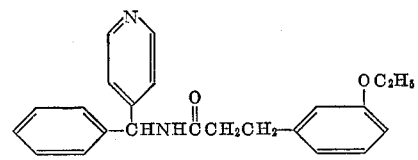

Example 10

N-[phenyl(4 - pyridyl)methyl]-α-(styryl)acetamide.—Using the technique of Example 3, 18 parts of 4-phenyl-3-butenoyl chloride and approximately 18 parts of 4-(α-aminobenzyl)pyridine in 320 parts of butanone is reacted together to give N-[phenyl(4-pyridyl)methyl]-α-(styryl) acetamide. The product has the formula

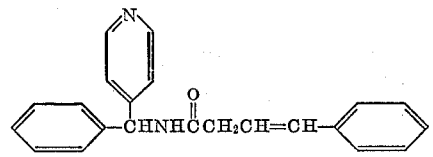

Example 11

N-[phenyl(4-pyridyl)methyl]cinnamamide.—To a solution of approximately 18 parts of 4-(α-aminobenzyl)-pyridine in 120 parts of butanone under reflux is added, cautiously with agitation, a solution of 20 parts of cinnamoyl chloride in 80 parts of butanone. Agitation at the boiling point under reflux is maintained overnight, whereupon the precipitate formed in process is filtered off and taken up in water. From the aqueous extract, on alkalization, N-[phenyl(4 - pyridyl)methyl]cinnamamide precipitates. The product is extracted into ether; and the ether extract is, successively, dried over anhydrous potassium carbonate, treated with decolorizing charcoal, and stripped of solvent by evaporation. The residue, crystallized from a mixture of ethyl acetate and hexane, melts at 150–152°. The product has the formula

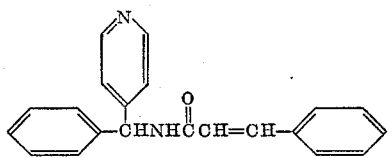

What is claimed is:
1. A compound of the formula

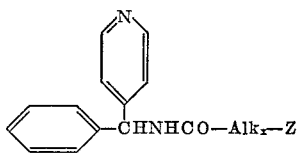

wherein Alk is selected from the group consisting of lower alkylene and lower alkenylene radicals; $x$ is selected from the group consisting of 0 and the positive integer 1; and Z is selected from the group consisting of lower alkyl, phenyl, mono(lower alkoxy)phenyl, di(lower alkoxy)phenyl, and tri(lower alkoxy)phenyl radicals.

2. A compound of the formula

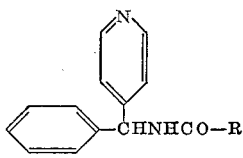

wherein R is a lower alkyl radical.

3. N-[phenyl(4-pyridyl)methyl]acetamide.
4. N-[phenyl(4-pyridyl)methyl]benzamide.
5. A compound of the formula

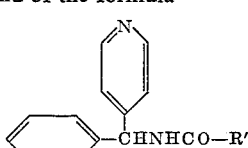

wherein R' is a tri(lower alkoxy)phenyl radical.

6. 3,4,5-trimethoxy - N - [phenyl(4-pyridyl)methyl]benzamide.

7. A compound of the formula

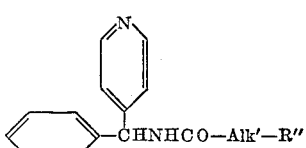

wherein Alk' is a lower alkylene radical and R" is a phenyl radical substituted by at least 1 and fewer than 4 lower alkoxy radicals.

8. α-(3,4-dimethoxyphenyl) - N - [phenyl(4-pyridyl)methyl]acetamide.

9. A compound of the formula

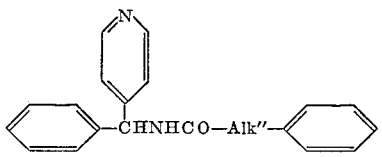

wherein Alk" is a lower alkenylene radical.

10. N-[phenyl(4-pyridyl)methyl]cinnamamide.

11. In a process for the manufacture of compounds of the formula

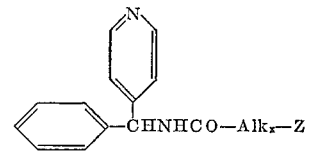

wherein Alk is selected from the group consisting of lower alkylene and lower alkenylene radicals; $x$ is selected from the group consisting of 0 and the positive integer 1; and Z is selected from the group consisting of lower alkyl, phenyl, mono(lower alkoxy)phenyl, di(lower alkoxy)phenyl, and tri(lower alkoxy)phenyl radicals, the step which comprises heating 4-(α-aminobenzyl)-pyridine with an acid chloride of the formula

Z—Alk$_x$COCl in an inert solvent, Z, Alk, and $x$ being defined as above.

References Cited in the file of this patent
UNITED STATES PATENTS

| 2,508,332 | Panizzon | May 16, 1950 |
| 2,843,520 | Kittila | July 15, 1958 |

FOREIGN PATENTS

| 589,625 | Great Britain | June 25, 1947 |

OTHER REFERENCES

La Forge: Jour. Am. Chem. Soc., vol. 50, pages 2484–87 (1928).

Bower et al.: J. Chem. Soc., vol. 1955, pages 2834–7 (1955).